(12) United States Patent
Yamaguchi et al.

(10) Patent No.: US 6,762,518 B1
(45) Date of Patent: Jul. 13, 2004

(54) FLAT CORE BRUSHLESS MOTOR

(75) Inventors: Tadao Yamaguchi, Isesaki (JP); Naohisa Koyanagi, Isesaki (JP); Toru Arai, Isesaki (JP)

(73) Assignee: Tokyo Parts Industrial Co., Ltd., Gunma-ken (JP)

( * ) Notice: Subject to any disclaimer, the term of this patent is extended or adjusted under 35 U.S.C. 154(b) by 0 days.

(21) Appl. No.: 09/587,340

(22) Filed: Jun. 5, 2000

(51) Int. Cl.[7] .......................... H02K 29/00; H02K 5/00; H02K 11/00
(52) U.S. Cl. .......................... 310/67 R; 310/91; 310/71; 310/DIG. 6
(58) Field of Search .............................. 310/67 R, 254, 310/91, 71, 156.32, DIG. 6; 384/126; H02K 29/00, 1/14, 21/22, 5/00, 11/00

(56) References Cited

U.S. PATENT DOCUMENTS

| | | | | |
|---|---|---|---|---|
| 4,626,727 A | * | 12/1986 | Janson | 310/156.32 |
| 5,604,389 A | * | 2/1997 | Nitta | 310/67 R |
| 5,747,908 A | * | 5/1998 | Saneshige et al. | 310/91 |
| 5,973,428 A | * | 10/1999 | Zakrocki et al. | 310/67 R |
| 6,104,114 A | * | 8/2000 | Takeda | 310/67 R |
| 6,242,826 B1 | * | 6/2001 | Saito et al. | 310/67 R |
| 6,249,505 B1 | * | 6/2001 | Miyamoto et al. | 369/266 |
| 6,252,319 B1 | * | 6/2001 | Sudo et al. | 310/67 R |
| 6,339,273 B1 | * | 1/2002 | Higuchi | 310/91 |
| 6,420,805 B1 | * | 7/2002 | Yamaguchi et al. | 310/67 R |
| 6,525,441 B2 | * | 2/2003 | Yamaguchi | 310/90 |
| 6,617,724 B2 | * | 9/2003 | Yamaguchi | 310/71 |

FOREIGN PATENT DOCUMENTS

JP   09364163 A   *   7/1999   .......... H02K/21/22

* cited by examiner

*Primary Examiner*—Burton S. Mullins
*Assistant Examiner*—Karen Beth Addison
(74) *Attorney, Agent, or Firm*—Leydig, Voit & Mayer, Ltd.

(57) ABSTRACT

A flat core brushless motor including a stator having a stator base with protruding poles, and a respective wound armature coil wrapped around each of the protruding poles, wherein the stator base includes at least one concave portion receiving the armature coils.

3 Claims, 5 Drawing Sheets

FLAT CORE BRUSHLESS MOTOR

BACKGROUND OF THE INVENTION

1. Field of the Invention

The present invention relates to an improvement of a flat core brushless motor suitable for driving a spindle or a pickup used for a portable mini disk apparatus.

2. Description of the Related Art

A conventional flat core brushless spindle motor used for a portable mini disk apparatus is shown in FIG. 5. That is, a brass bearing holder H is installed at a stator base B. A stator core C is formed by winding an armature coil N around a plurality of protruding poles, and is installed at the outer circumferential surface of the bearing holder H. A bearing J is installed inside the bearing holder H. A rotor R having a magnet M which is installed in a magnet holder Y facing the stator core C with a gap, is supported through a shaft S rotatably inserted in the bearing J. In the drawing, T denotes a turntable on which media is installed, which is integrally formed with the rotor R.

However, the flat spindle motor having the above structure is restricted in being made thinner by an expanded portion of the armature coil N wound around the protruding poles. Thus, the expanded portion of the armature coil is usually compressed and impregnated. Nevertheless, there is a problem of occasional disconnection or shorting of lines.

Also, when the expanded portion of the armature coil is not compressed and impregnated, the number of accumulated thickness units of a core must be reduced and thus the property of the motor is sacrificed. To solve this problem, a part of the core has an L shape. That is, a blade portion of the core is folded in an axial direction. However, this increases the manufacturing cost.

SUMMARY OF THE INVENTION

To solve the above problems, it is an objective of the present invention to provide a flat core brushless motor which can be made thin without compressing and reducing the expanded portion of an armature coil, to help reduce the effect of the stator base on the overall thickness of the motor, and without reducing the number of accumulated thickness units of a core, so that the properties of a motor are not sacrificed.

Accordingly, to achieve the above objective, there is provided a flat type core brushless motor formed by installing a stator which is made by winding an armature coil around each of a plurality of protruding poles at a stator base, in which a concave portion for escape of the armature coil is installed at the stator base.

It is preferred in the present invention that the concave portion for escape of the armature coil is a hole arranged at a circuit board attached to the stator base.

It is preferred in the present invention that the concave portion for escape of the armature coil is a hole arranged at a circuit board attached to the stator base and a hole installed at the stator base thereunder.

It is preferred in the present invention that the concave portion for escape of the armature coil is a hole arranged at a circuit board attached to the stator base and a hole installed at the stator base thereunder.

It is preferred in the present invention that the circuit board is formed of a thin flexible sheet to cover the edge of the hole formed in the stator base.

It is preferred in the present invention that a plurality of supports, which are lifted from the stator base by pressing processing, are used as a means for installing the stator and simultaneously a hole formed by the press processing for lifting the supports is used as part of the concave portion for escape of the armature coil.

It is preferred in the present invention that a rotation support portion is arranged inside the supports.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 1:
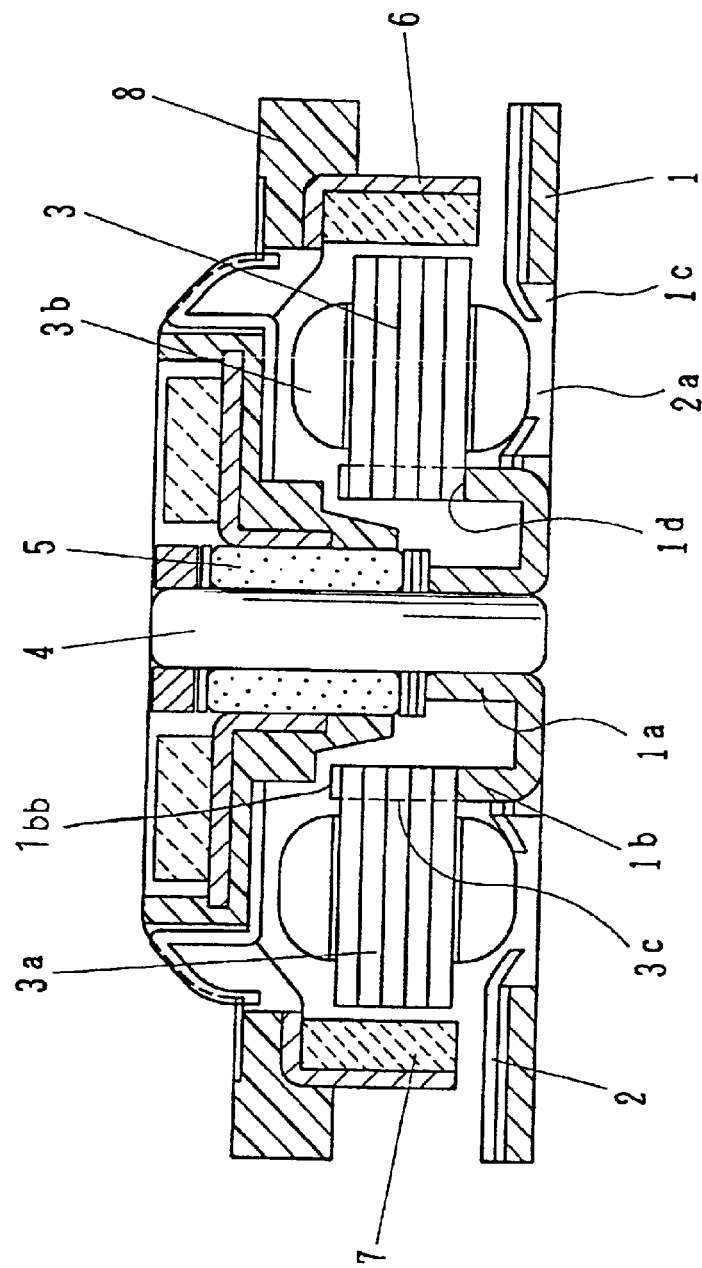
FIG. 1 is a sectional view showing a flat core brushless motor according to a first preferred embodiment of the present invention.
Figure 2:
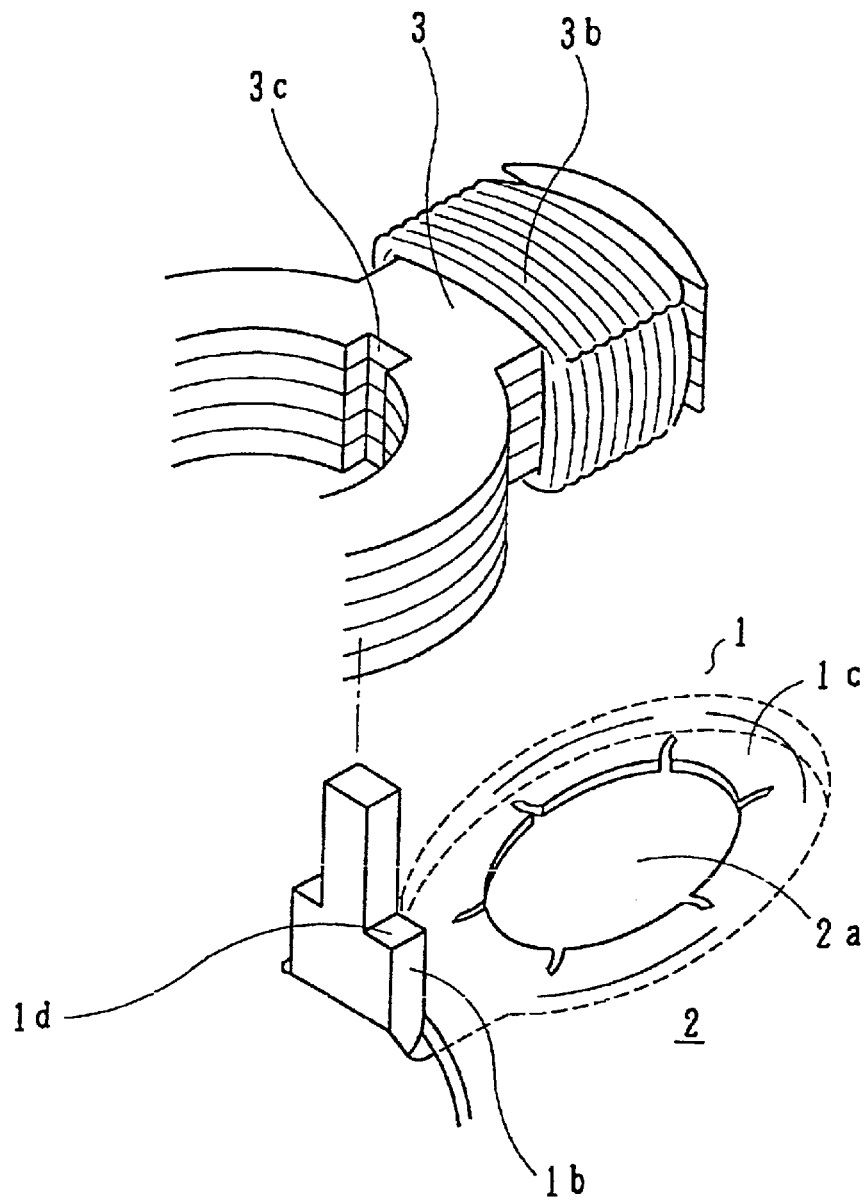
FIG. 2 is a perspective view showing the assembly of major parts of the flat core brushless motor according to the first preferred embodiment of the present invention.

Referring to FIG. 1, reference numeral 1 denotes a stator base of a thin rolled steel plate. A circuit board 2 of a polyamide or polyester film is attached to the stator base 1 by a double-sided adhesive film interposed therebetween. A shaft holder 1a is formed by a clamping process at the center of the stator base 1. Supports 1b for maintaining a stator core 3 which will be described later are formed around the shaft holder 1a by being lifted, for each of protruding poles 3a of the stator core 3. Prior to the lifting of the support 1b, as shown in FIG. 2, a slightly enlarged hole, that is, a concave portion 1c for accommodating an expanded portion of an armature coil 3b, is provided. In this case, the circuit board 2 is cut to make a concave portion 2a having a diameter less than that of the concave portion 1c for insulation so that the expanded portion of the armature coil 3b can easily extend therethrough.

Reference numeral 3 denotes a stator core formed by stacking five silicon steel plates. The stator core includes the plurality of protruding poles 3a. Respective armature coils 3b are wound around the protruding poles 3a. A recess 3c supported by an end portion 1d of the support 1b is located inside the stator core 3. Also, although the stator core 3 is described as having five stacked silicon steel plates in the preferred embodiments shown in FIGS. 1 through 4, the number of silicon steel plates of the present invention is not limited thereto.

The stator core 3 is installed at the stator base 1 by fitting the support 1b into the recess 3c. The stator core 3 is fixed by crushing a top portion 1bb of the support 1b or inserting a wedge between the end portion of the support 1b and the stator core 3. Of course, the stator core 3 can be fixed by using an adhesive. A terminal of each armature coil 3b is connected to a predetermined pattern of the circuit board 2 by soldering, thus completing a stator.

Thus, the expanded portion of each of the armature coils 3b, of which a part is accommodated in the concave portions 2a and 1c, can have a low profile. Also, in the present embodiment, the shaft 4 is fixed by being directly pressed into and installed in the shaft holder 1a.

A rotor includes a bearing 5 rotatably installed at the shaft 4, a rotor case 6 installed at the bearing 5, and a ring rubber magnet 7 which is pressed and fixedly installed inside the rotor case 6 by bending a plate to face the protruding poles 3a, . . . of the stator core 3 with the gap in a radial direction. Further, the rotor case 6 is integrally formed with a turntable 8 on which a medium is installed.

Figure 3:
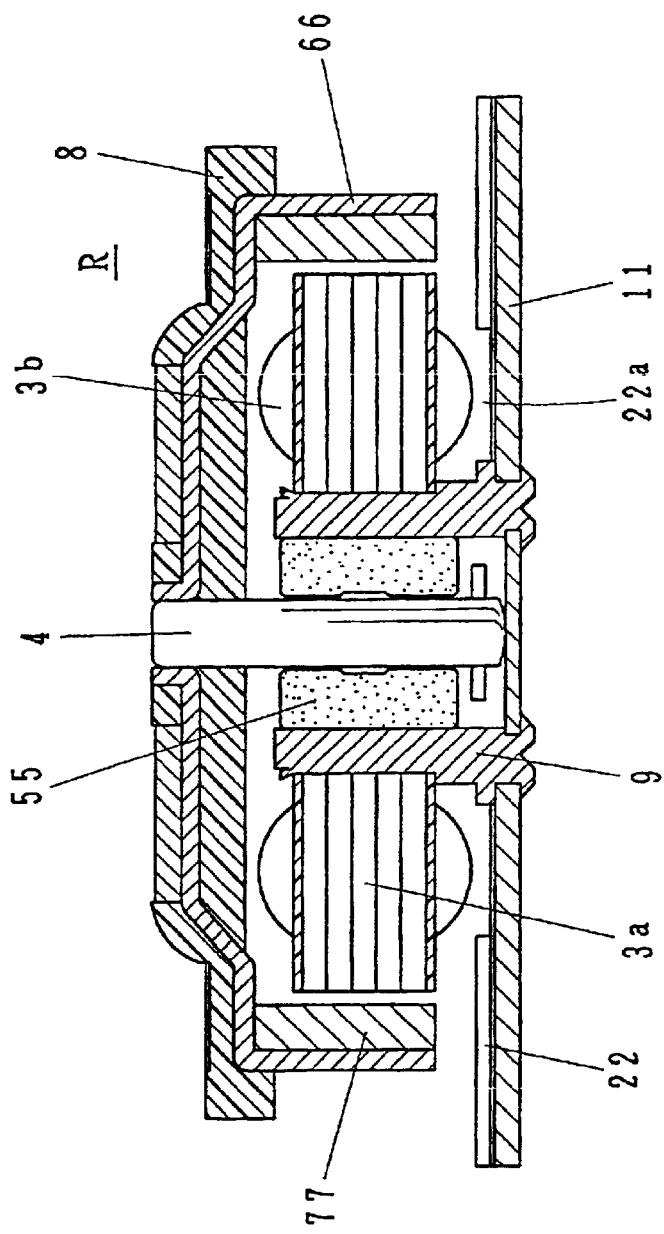
FIG. 3 is a sectional view showing a flat core brushless motor according to a second preferred embodiment of the present invention.

A second preferred embodiment is shown in FIG. 3, which is suitable for a circuit board 22 that is relatively thick. That is, a concave portion 22a into which an expanded portion of an armature coil 3b can protrude is located only in the circuit board 22.

In this case, the rotor R has a rotating shaft and a brass bearing holder 9 is installed at a stator base 11 by caulking. The rotor R includes a shaft 4 inserted in a bearing 55 installed inside a bearing holder 9, a rotor case 66 which is pressed and fixedly installed at the shaft 4, and a neodymium magnet 77 arranged inside the rotor case 66.

Figure 4:
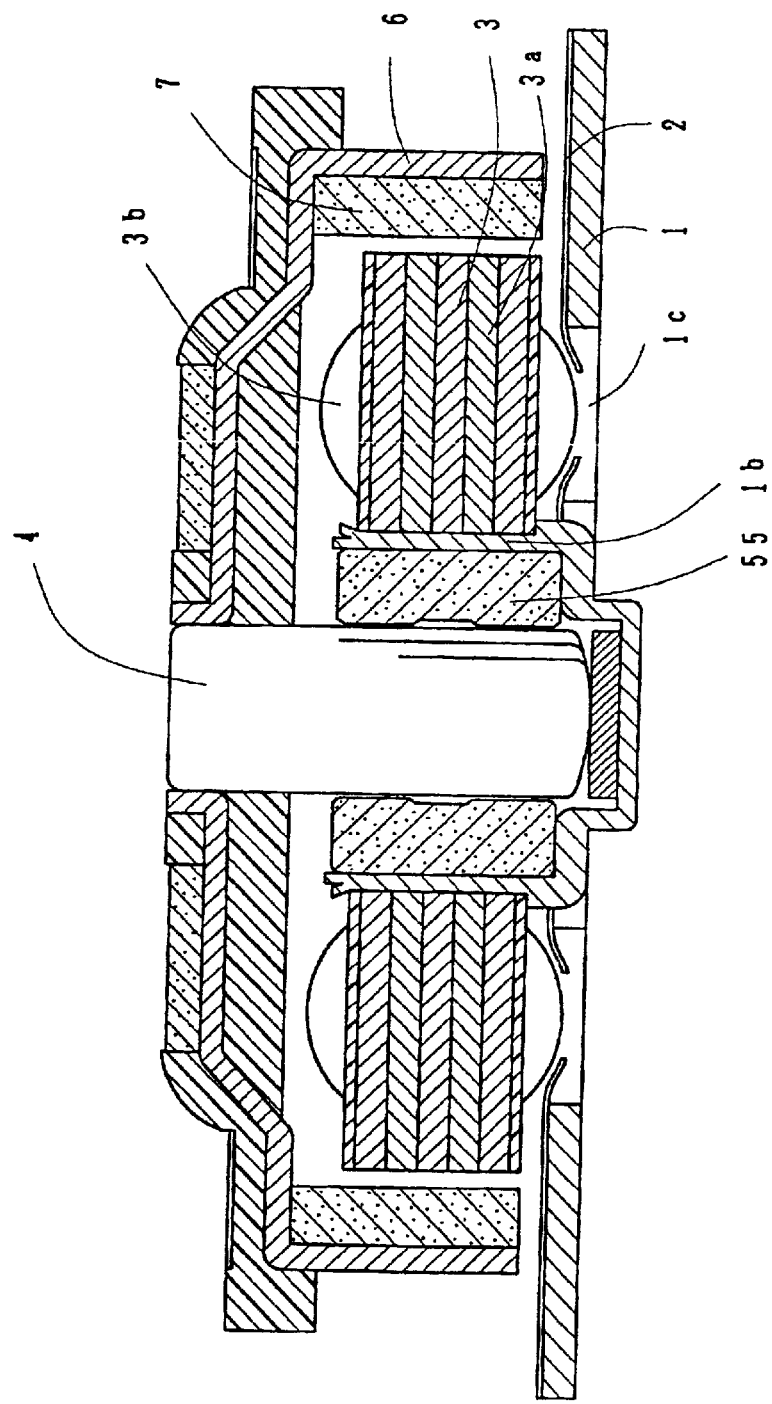
FIG. 4 is a sectional view showing a flat core brushless motor according to a third preferred embodiment of the present invention.
Figure 5:
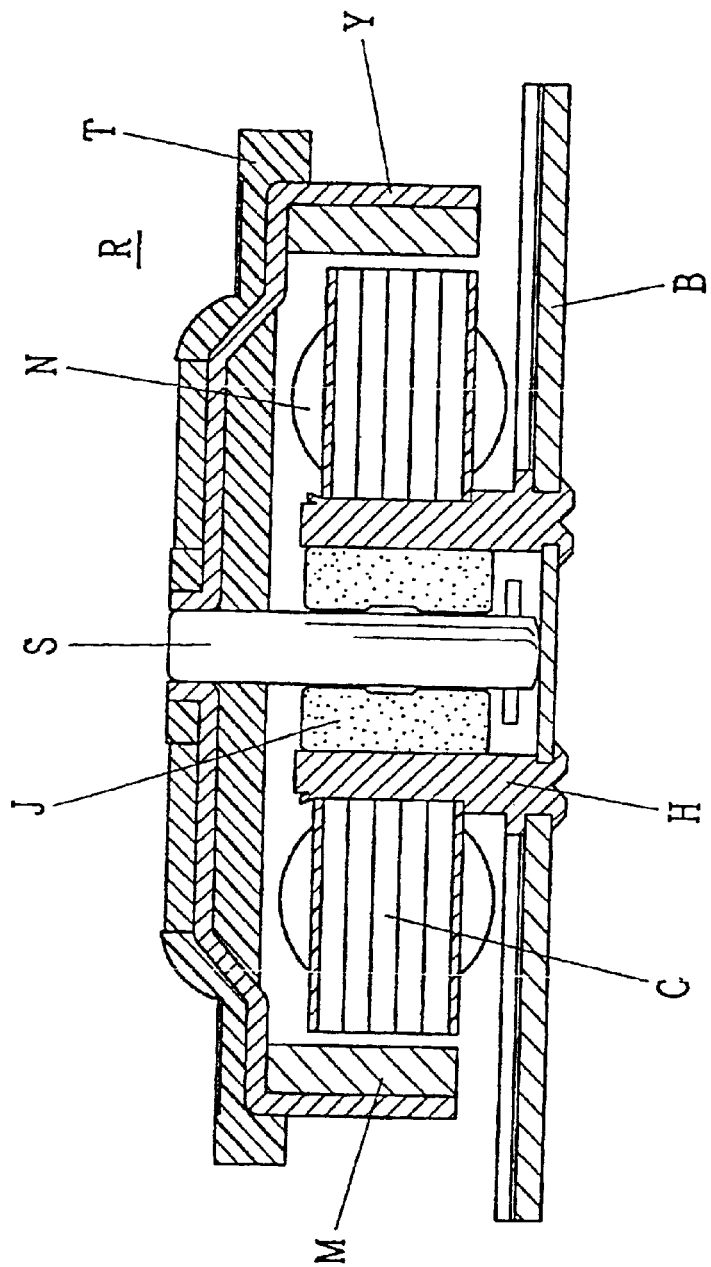
FIG. 5 is a sectional view showing the general structure of a conventional flat core brushless motor.

FIG. 4 shows a third preferred embodiment of the present invention. In the present embodiment, a rotating shaft rotor is rotatably installed through a shaft 4 at a bearing 55 arranged inside a support 1b. The bearing 55 may be directly pressed into and inserted in the support 1b or installed inside a stator core 3. Here, as the rest of the structure is the same as that of the first preferred embodiment, the same reference numerals are used for the same elements and descriptions thereof are omitted.

It is noted that the present invention is not limited to the preferred embodiments described above, and it is apparent that variations and modifications by those skilled in the art can be effected within the spirit and scope of the present invention defined in the appended claims.

As described above, in a flat brushless motor according to the present invention formed by installing a stator made by winding an armature coil around each of a plurality of protruding poles at a stator base, because an expanded portion of the armature coil is received in a concave portion of the stator base, there is no need to restrict the armature coil and a flat brushless motor without problems such as disconnection or shorting of lines can be provided.

Also, the motor is suitable for a case in which the circuit board is relatively thick, while it can provide a flat core brushless motor when an expanded portion of the armature coil is considerably large.

Furthermore, the brass bearing holder is not needed and the structure is simplified by using fixed shaft motor. Thus, a flat core brushless motor with reduced the manufacturing cost can be provided.

What is claimed is:

1. A flat core brushless motor comprising:

a rotor case;

a stator including a stator core, the stator core having a plurality of protruding poles and a plurality of armature coils, each armature coil being wound around a respective protruding pole;

a stator base having a generally planar portion including a plurality of through holes, each through hole receiving part of a respective armature coil, and a plurality of supports bent from and transverse to the generally planar portion, the plurality of supports supporting the stator, the plurality of supports and the plurality of protruding poles being equal in number;

a shaft fixedly mounted to the stator base, at a center of the stator base, and extending through a center of the rotor case;

a flexible circuit board located between the stator base and the stator, having a plurality of holes smaller than the through holes, located opposite respective through holes, and covering edges of the respective through holes; and a bearing located intermediate the supports and the shaft, rotatingly supporting the rotor case on the shaft.

2. The flat core brushless motor as claimed in claim 1, wherein the stator core includes recesses complementary to and receiving the corresponding supports.

3. A flat core brushless motor comprising:

a rotor case;

a stator including a stator core, the stator core having a plurality of protruding poles and a plurality of armature coils, each armature coil being wound around a respective protruding pole;

a stator base having a generally planar portion including a plurality of through holes, each through hole receiving part of a respective armature coil, and a plurality of supports bent from and transverse to the generally planar portion, the plurality of supports supporting the stator, the plurality of supports and the plurality of protruding poles being equal in number;

a shaft fixedly mounted to the rotor case, at a center of the rotor case, and extending to the stator base;

a flexible circuit board located between the stator base and the stator, having a plurality of holes smaller than the through holes, located opposite respective through holes, and covering edges of the respective through holes; and a bearing fixedly mounted centrally to the stator base by the plurality of supports, rotatingly supporting the shaft and the rotor case mounted to the shaft.

* * * * *